United States Patent
Nakata

(10) Patent No.: US 8,355,730 B2
(45) Date of Patent: Jan. 15, 2013

(54) RADIO NETWORK CONTROLLER, MOBILE COMMUNICATION SYSTEM, AND METHOD FOR AVOIDING A REDUCTION IN A CALL CONNECTION COMPLETION RATIO FOR USE THEREIN

(75) Inventor: Atsushi Nakata, Tokyo (JP)

(73) Assignee: NEC Corporation, Tokyo (JP)

( * ) Notice: Subject to any disclaimer, the term of this patent is extended or adjusted under 35 U.S.C. 154(b) by 143 days.

(21) Appl. No.: 12/738,865

(22) PCT Filed: Aug. 28, 2008

(86) PCT No.: PCT/JP2008/065432
§ 371 (c)(1),
(2), (4) Date: Aug. 30, 2010

(87) PCT Pub. No.: WO2009/063675
PCT Pub. Date: May 22, 2009

(65) Prior Publication Data
US 2010/0317352 A1 Dec. 16, 2010

(30) Foreign Application Priority Data
Nov. 14, 2007 (JP) ................................. 2007-295002

(51) Int. Cl.
*H04W 40/00* (2009.01)
(52) U.S. Cl. ..................... 455/445; 455/453; 455/422.1; 455/423; 455/436; 455/435.2
(58) Field of Classification Search .................. 455/445, 455/453, 422.1, 423, 436, 435.2
See application file for complete search history.

(56) References Cited

U.S. PATENT DOCUMENTS

| 6,553,231 | B1 * | 4/2003 | Karlsson et al. | 455/436 |
| 2005/0163074 | A1 * | 7/2005 | Mella et al. | 370/329 |
| 2006/0084443 | A1 | 4/2006 | Yeo et al. | |
| 2006/0116156 | A1 | 6/2006 | Haseba et al. | |
| 2006/0246888 | A1 * | 11/2006 | Bender et al. | 455/423 |
| 2009/0075690 | A1 * | 3/2009 | Roberts et al. | 455/552.1 |

FOREIGN PATENT DOCUMENTS
CN 1784078 A 6/2006
(Continued)

OTHER PUBLICATIONS

International Search Report for PCT/JP2008/065432 mailed Oct. 21, 2008.
Chinese Office Action for CN200880116224.1 issued on Jun. 26, 2012.

*Primary Examiner* — Barry Taylor

(57) ABSTRACT

A radio network controller (1) to be connected to a mobile terminal via a radio base station comprises: holding means (UE check list 15 for each system) for, when each mobile terminal has failed to make a radio connection to a cell (s) selected by a cell selection algorithm that assigns a cell (s) under the radio base station to the mobile terminal, holding information of the cell (s) to which the mobile terminal has failed to make a radio connection, for a predetermined period; and execution means (cell selection processor 11) for excluding a cell (s) to which the mobile terminal has failed a radio connection once in the past, from adjacent cell candidates of said mobile terminal, based on the cell information held by the holding means, for a predetermined period, and to execute the cell selection algorithm.

6 Claims, 14 Drawing Sheets

FOREIGN PATENT DOCUMENTS

| | | |
|---|---|---|
| CN | 101044783 A | 9/2007 |
| JP | 2001211184 A | 8/2001 |
| JP | 2004112295 A | 4/2004 |
| JP | 2006229384 A | 8/2006 |
| JP | 2007150779 A | 6/2007 |
| WO | 2006043131 A | 4/2006 |

* cited by examiner

UE CHECK LIST       15 (Fig. 3)

| UE ID | TIME STAMP | RADIO CONNECTION FAILURE CELL | | | |
|---|---|---|---|---|---|
| #1 | 00130 | 8 | | | |
| #2 | 00145 | 10 | 11 | | |
| ⋮ | ⋮ | ⋮ | ⋮ | ⋮ | ⋮ |
| | | | | | |

SYSTEM DATA FOR UE CHECK LIST   16 (Fig. 3)

| PARAMETER | RANGE | PRESENT SET VALUE |
|---|---|---|
| NUMBER OF UES WHICH CAN BE REGISTERED | 0~1000 | 50 |
| NUMBER OF CELLS TO BE REGISTERED | 1~10 | 4 |
| EFFECTIVE TIME OF HELD INFORMATION | 1~60[minute] | 3 |

Fig.9

UE CHECK LIST #2

| UE ID | TIME STAMP – RADIO CONNECTION FAILURE CELL INFORMATION | | | |
|---|---|---|---|---|
| | TIME STAMP | RADIO CONNECTION FAILURE CELL | TIME STAMP | RADIO CONNECTION FAILURE CELL |
| #1 | 00130 | 8 | | |
| #2 | 00145 | 10 | 00150 | 11 |
| ⋮ | ⋮ | ⋮ | ⋮ | ⋮ |
| | | | | |

UE CHECK LIST UPON CTS

| TIME STAMP – RADIO CONNECTION FAILURE CELL INFORMATION | | | | |
|---|---|---|---|---|
| TIME STAMP | RADIO CONNECTION FAILURE CELL | TIME STAMP | RADIO CONNECTION FAILURE CELL | ... |
| 00145 | 10 | 00150 | 11 | ... |

RADIO NETWORK CONTROLLER, MOBILE COMMUNICATION SYSTEM, AND METHOD FOR AVOIDING A REDUCTION IN A CALL CONNECTION COMPLETION RATIO FOR USE THEREIN

The present application is the National Phase of PCT/JP2008/065432, filed Aug. 28, 2008, which claims priority based on Japanese patent application No. 2007-295002 filed on Nov. 14, 2007, and incorporates herein the entire disclosure thereof by reference.

TECHNICAL FIELD

The present invention relates to a radio network controller, a mobile communication system, and a method for use therein of avoiding a reduction in a call completion ratio, and more particularly to a method of avoiding a reduction in a call connection completion ratio in a cell selection algorithm.

BACKGROUND ART

In an RNC (Radio Network Controller) with which the present invention is concerned, as shown in FIG. 1, an IMT (International Mobile Telecommunications) 2000 system which is a third-generation mobile communication system controls a plurality of base stations (Node B) 2, 3 to manage a plurality of cell information under one base station.

For making a radio connection to UE (User Equipment), RNC 1 selects a cell according to a cell selection algorithm that takes into consideration various parameters such as UE capability, service sought by the UE, cells which can provide a service to the UE, a high-speed service providing situation, a cell load calculated from the number of UEs of each cell and a service load executed by the UE, and the congestion state of base stations 2, 3. RNC 1 then confirms whether the selected cell can accept the newly called UE or not and assigns the UE to the cell.

RNC 1 operates according to the cell selection algorithm shown below. The cell selection algorithm will be described below with reference to FIG. 1.

As disclosed in JP2006-229384A, for example, RNC 1 covers a mixture of an E-DCH [Enhanced uplink DCH (Dedicated Channel)]/HS-DSCH (High Speed Downlink Shared Channel) service unprovidable cell, an HS-DSCH cell, and an E-DCH/HS-DSCH cell which have different frequencies with the same antenna, and is triggered by the moments shown below to carry out Local Control to select a cell in an environment wherein a mixture of E-DCH/HS-DSCH service unexecutable UE 4, HS-DSCH capable UE 5, and E-DCH/HS-DSCH capable UE 6 is present in the same area.

The moments are:
1. when RNC 1 receives a first RRC (Radio Resource Control) Connection Request message: and
2. when RNC 1 changes channel types from a CTS FACH (Forward Access Channel) to a DCH upon the reception of a traffic increase report from the UE or upon detection of a transfer buffer increase in the RNC while connecting a packet service via a shared channel.

When RNC 1 executes the cell selection algorithm, RNC 1 does not recognize the actual radio environment far ahead. Therefore, when RNC 1 assigns a cell which is different from the cell that the UE has camped on, RNC 1 does not receive a response from the UE indicating that it has established a radio connection a the new cell. Therefore, the call connection completion ratio is lowered.

The above problem is caused by a phenomenon called cell breathing wherein a cell that is capable of high speed data services has its cell size becoming larger or smaller with time due to the very large number of UEs which execute high speed data services and the degree of interference with adjacent cells.

For example, when UE seeking a high speed data service camps on a cell that is not capable of providing a high speed data service and sends an RRC Connection Request message, cell breathing occurs as shown in FIG. 2, and RNC 1 may select a high speed data providing cell having a small cell size according to the cell selection algorithm.

In such a case, RNC 1 selects the cell whose cell size is small due to the cell breathing shown in FIG. 2 and sends an RRC Connection Setup message, and is unable to receive an RRC Connection Setup Complete response from the UE.

Even when the UE sends an RRC Connection Request message again, RNC 1 selects the same cell according to the same cell selection algorithm. As RNC 1 fails to make a radio connection, no radio connection will be completed, and the call connection completion ratio will be greatly lowered, in the same manner as described above.

In this case, even when there is no UE response from a high speed data providing cell and the UE sends an RRC Connection Request message again, RNC 1, 1a similarly selects the same cell suffering cell breathing. Therefore, the call connection completion ratio will be greatly lowered.

The above cell selection algorithm with which the present invention is concerned is problematic in that when the size of a cell selected by the cell selection algorithm is temporarily reduced by cell breathing caused by the number of connected UEs and interference with adjacent cells, the RNC fails to make a radio connection, and the latest information indicating that there is a cell suffering radio connection failure is not stored or used.

The cell selection algorithm with which the present invention is concerned is also problematic in that the same cell is selected according to the cell selection algorithm upon the resending of an RRC Connection Request from the EU, the periodic reception of a traffic increase report from the UE, or the periodic detection of a transfer buffer increase in the RNC, so that the RNC fails to make a radio connection and the call connection completion ratio will be lowered, in the same manner as described above.

DISCLOSURE OF THE INVENTION

It is an object of the present invention to provide a radio network controller, a mobile communication system, and a method for use therein of avoiding a reduction in a call connection completion ratio, which will eliminate the above problems while making the best use of the advantages of an existing cell selection algorithm.

According to the present invention, there is provided a radio network controller connected to a mobile terminal via a radio base station, comprising holding means for holding information of one or more cells selected according to a cell selection algorithm for assigning a cell under the radio base station to the mobile terminal, for a predetermined period if a radio connection to the cells fails, and executing means for excluding the cells to which a radio connection have failed once in the past based on the stored information of the cell, and executing the cell selection algorithm.

A mobile communication system according to the present invention includes the above radio network controller.

According to the present invention, there is provided a method of avoiding a reduction in a call connection ratio in a radio network controller connected to a mobile terminal via a radio base station, comprising a first process of holding information of one or more cells selected according to a cell selection algorithm for assigning the cells under the radio base station to the mobile terminal, in holding means for a predetermined period if a radio connection to the cells fails, and a second process of excluding the cells to which a radio connection has failed once in the past based on the stored information of the cells, and executing the cell selection algorithm with executing means.

According to the present invention, the above arrangement and operation are advantageous in that it is possible to avoid a reduction in a call connection completion ratio while making the best use of the advantages of an existing cell selection algorithm.

BRIEF DESCRIPTION OF THE DRAWINGS

FIG. 9 is a diagram showing details of a UE check list #2 according to Exemplary embodiment 2 of the present invention;

BEST MODE FOR CARRYING OUT THE INVENTION

Figures 3, 4:
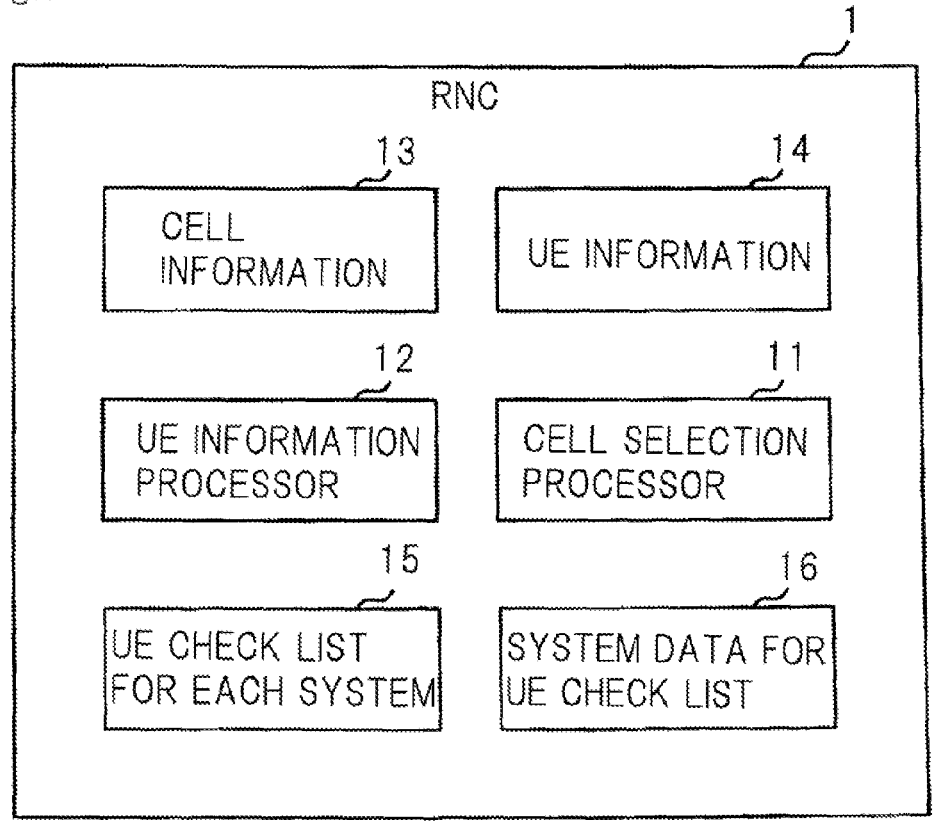
FIG. 3 is a block diagram showing a configurational example of an RNC according to Exemplary embodiment 1 of the present invention.
FIG. 4 is a diagram showing details of a UE check list for each system shown in FIG. 3.

Exemplary embodiments of the present invention will be described below with reference to the drawings. FIG. 3 is a block diagram showing a configurational example of an RNC (Radio Network Controller) according to Exemplary embodiment 1 of the present invention.

As shown in FIG. 3, RNC 1 comprises cell selection processor 11 and UE (User Equipment: mobile terminal) information processor 12, and holds cell information 13, UE information 14, UE check list 15 for each system, and system data 16 for the UE check list.

Cell selection processor 11 executes a cell selection algorithm based on information acquired from UE information processor 12, cell information 13, UE information 14, UE check list 15 for each system, and system data 16 for the UE check list.

Figure 1:
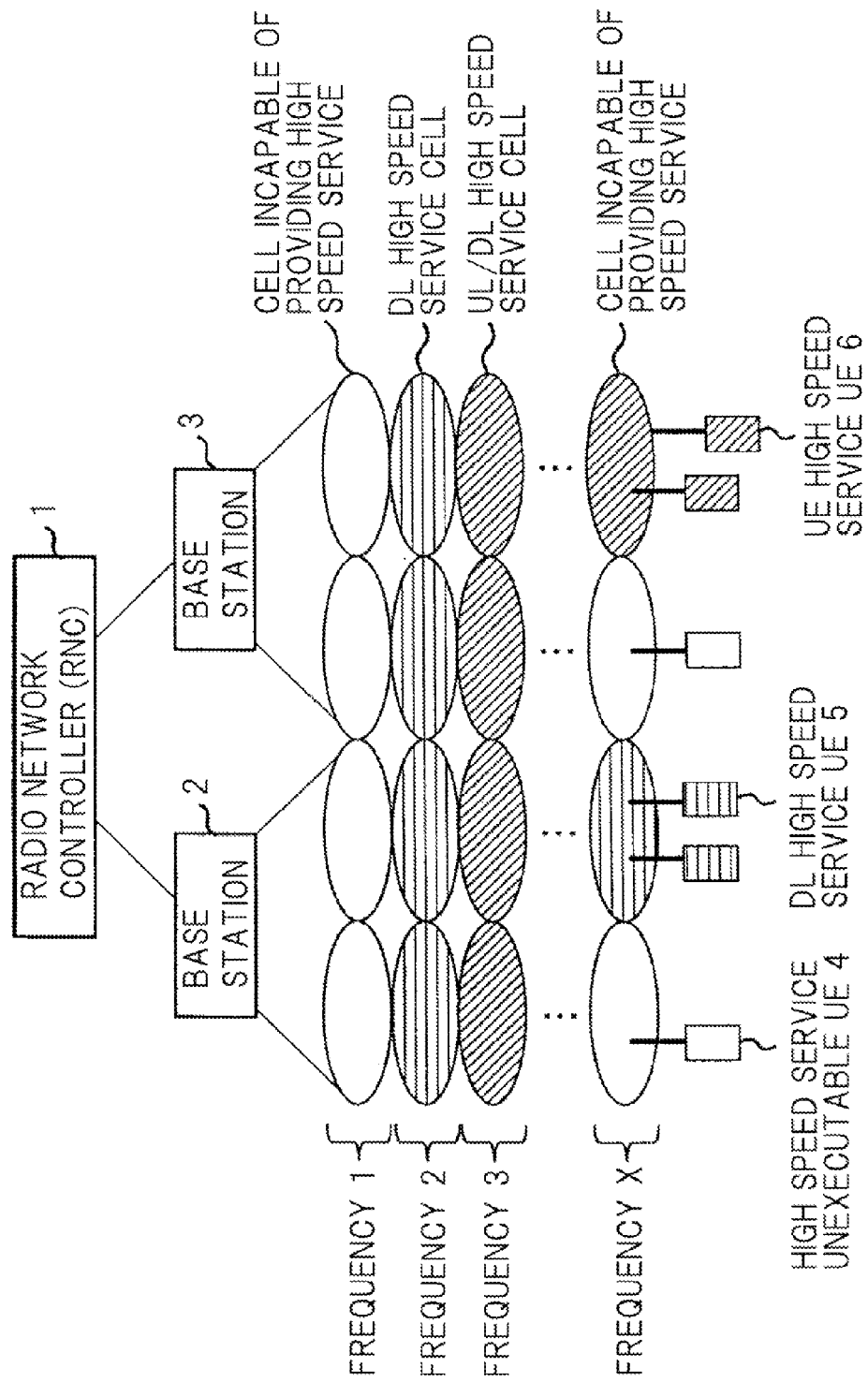
FIG. 1 is a block diagram showing the configuration of a mobile communication system according to Exemplary embodiment 1 of the present invention.
Figure 2:
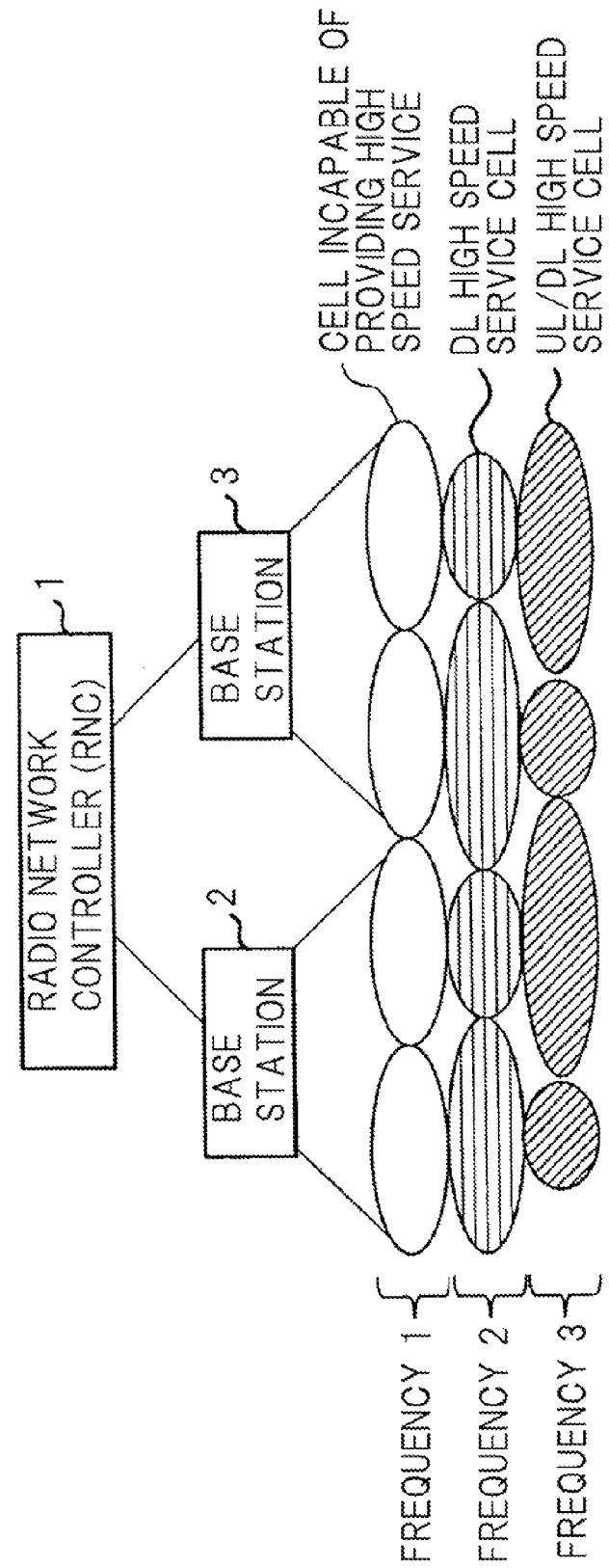
FIG. 2 is a diagram showing a phenomenon of cell breathing.

FIG. 1 is a block diagram showing the configuration of a mobile communication system according to Exemplary embodiment 1 of the present invention. As shown in FIG. 1, the mobile communication system according to Exemplary embodiment 1 of the present invention comprises RNC 1, base stations 2, 3, UE 4 that is not capable of providing E-DCH [Enhanced uplink DCH (Dedicated Channel)]/HS-DSCH (High Speed Downlink Shared Channel) service, HS-DSCH capable UE 5, and E-DCH/HS-DSCH capable UE 6.

RNC 1 covers a mixture of an E-DCH [Enhanced uplink DCH (Dedicated Channel)]/HS-DSCH (High Speed Downlink Shared Channel) service unprovidable cell, an HS-DSCH cell, and an E-DCH/HS-DSCH cell which have different frequencies with the same antenna, and assigns channels depending on the abilities of UEs to E-DCH/HS-DSCH service unexecutable UE 4, HS-DSCH capable UE 5, and E-DCH/HS-DSCH capable UE 6 which are mixed together in the same area, for thereby providing packet services with high frequency utilization efficiency.

FIG. 4 is a diagram showing details of UE check list 15 for each system shown in FIG. 3. As shown in FIG. 4, UE check list 15 for each system holds a list of cells to which each UE has failed to make a radio connection once and a time stamp at which a connection request made by the UE.

In the example shown in FIG. 4, cell ID #8 is registered at UE #1 as a cell to which the UE has failed to make a radio connection once at Time: 00130, and cell ID #10 and cell ID #11 are registered at UE #2 as cells to which the UE has failed to make a radio connection once at Time: 00145.

Figure 5:
FIG. 5 is a diagram showing details of system data for the UE check list shown in FIG. 3.

FIG. 5 is a diagram showing details of system data 16 for the UE check list shown in FIG. 3. As shown in FIG. 5, system data 16 for the UE check list holds the number of UEs for each of which a list of cells to which the UE has failed to make a radio connection once can be registered, the effective time of the information held by the UE check list, and the number of cells to be registered.

In the example shown in FIG. 5, the number of UEs which can be registered in the US check list is 50, and the effective time of the information held by the UE check list is 3 minutes. The number of UEs which can be registered in the UE check list and the number of cells to be registered affect the memory utilization rate of RNC 1. In particular, if the number of UEs which can be registered in the US check list is 0, then it means that the present function is invalidated.

The configuration of the present exemplary embodiment has been described above. Since the configuration of cell information 13, the management of UE information, the configurations of UE information processor 12, and the configurations of cell selection processor 11 are themselves well known to those skilled in the art and since they have no direct bearing on the present invention, their descriptions will be omitted.

In particular, the cell selection algorithm to be executed by cell selection processor 11 may be a cell selection algorithm depending on the UE type in the IMT (International Mobile Telecommunications) 2000 system as proposed by the present applicant, or a Load Control algorithm for selecting cell(s) for an UE only from cell load information, e.g., a cell selection algorithm for selecting a cell whose cell load is the lowest, except that UE check list 15 and system data 16 for the UE check list are used. Since these cell selection algorithms are well known to those skilled in the art and have no direct bearing on the present invention, their description will be omitted.

Figure 6:
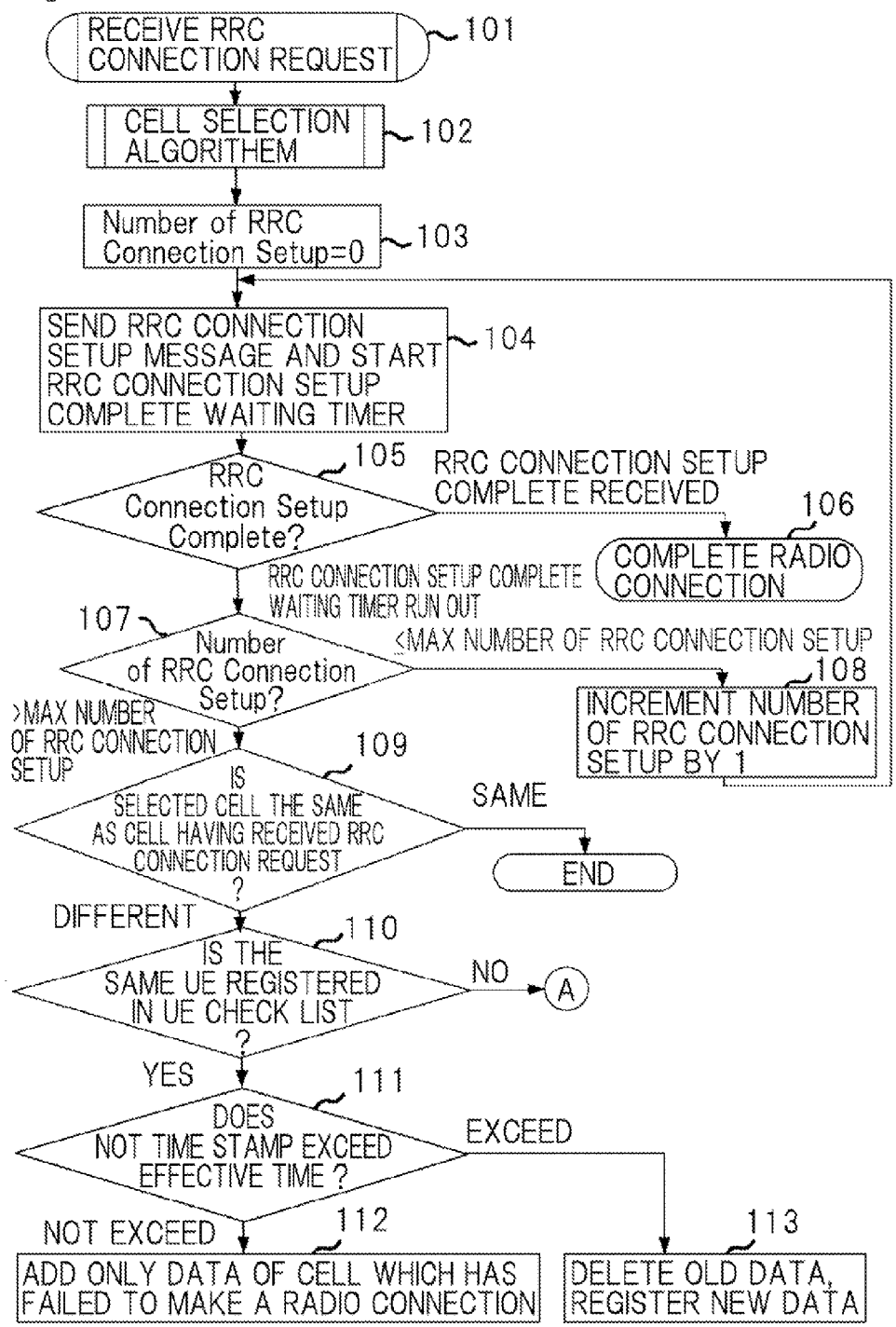
FIG. 6 is a flowchart of a process of registering the UE check list upon receipt of an RRC Connection Request message according to Exemplary embodiment 1 of the present invention.
Figure 7:
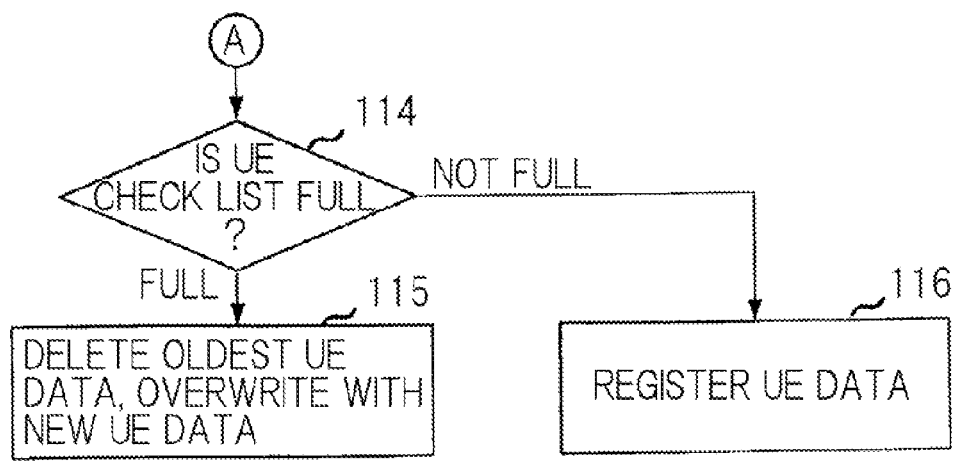
FIG. 7 is a flowchart of the process of registering the UE check list upon receipt of the RRC Connection Request message according to Exemplary embodiment 1 of the present invention.

FIGS. 6 and 7 are flowcharts of a process of registering the UE check list upon receipt of an RRC Connection Request message according to Exemplary embodiment 1 of the present invention. The process of registering the UE check list upon receipt of an RRC Convection Request message according to Exemplary embodiment 1 of the present invention will be described below with reference to FIGS. 1 to 7.

FIGS. 6 and 7 show a mode of operation in which after the cell selection algorithm has been executed upon the reception of an RRC Connection Request message, the UE fails to make a radio connection and is registered in UE check list 15 shown in FIG. 4.

When RNC 1 receives an RRC Connection Request message from an UE in step 101 shown in FIG. 6, cell selection processor 11 of RNC 1 executes a cell selection algorithm using information obtained from cell information 13, the management of the UE information, and UE information processor 12 in step 102.

In step 103, RNC 1 initializes an internal variable "Number of RRC Connection Setup" to 0. Then, in step 104, RNC 1 sends an RRC Connection Setup message to the selected cell, and starts an RRC Connection Setup Complete waiting timer.

RNC 1 determines in step 105 whether or not it has received an RRC Connection Setup Complete. If it has received the RRC Connection Setup Complete, then a radio connection is completed as in the existing process in step 106.

If RNC 1 has not received the RRC Connection Setup Complete and if the RRC Connection Setup Complete waiting timer times out, then RNC 1 determines in step 107 whether or not the internal variable "Number of RRC Connection Setup" has exceeded system data "Maximum Number of RRC Connection Setup".

If the internal variable "Number of RRC Connection Setup" does not exceed the system data "Maximum Number of RRC Connection Setup", RNC 1 increments the internal variable "Number of RRC Connection Setup" by 1 in step 108. Then, control returns to step 104.

If the internal variable "Number of RRC Connection Setup" has exceeded the system data "Maximum Number of RRC Connection Setup", then RNC 1 judges that a radio connection has failed, and determines in step 109 whether or not the cell that is selected according to the cell selection algorithm is the same as the cell to which the UE has initially sent the RRC Connection Request message.

If the cell that is selected according to the cell selection algorithm is the same as the cell to which the UE has initially sent the RRC Connection Request message, then RNC 1 puts an end to the process without registering the cell in UE check list 15.

If the cell that is selected according to the cell selection algorithm is different from the cell to which the UE has initially sent the RRC Connection Request message, then RNC 1 determines in step 110 whether or not the same UE has been registered in UE check list 15.

If the same UE has been registered in UE check list 15, then RNC 1 determines in step 111 whether or not the time stamp for the UE in UE check list 15 does not exceed the effective time of the information held by UE check list 15.

If the time stamp for the UE in UE check list 15 does not exceed the effective time of the information held by UE check list 15, then in step 112, RNC 1 adds in UE check list 15 only cell(s) to which the UE has failed to make a radio connection. At this time, the time stamp is not updated. If the same cell has already been registered, then nothing is done. If the number of cells registered is full in UE check list 15, then the cell is overwritten in UE check list 15 in a round robin manner. In other words, the initially entered cell which is considered to indicate the oldest information is overwritten.

If the time stamp for the UE in UE check list 15 exceeds the effective time of the information held by UE check list 15, then RNC 1 deletes the old data for the same UE (the radio connection failure cell and the time stamp) and registers new data (the radio connection failure cell and the time stamp) in step 113.

If the same cell has not been registered in UE check list 15, RNC 1 determines in step 114 shown in FIG. 7 whether or not UE check list 15 is full.

If UE check list 15 is full, then RNC 1 deletes the oldest data (the radio connection failure cell and the time stamp) and registers new data of the UE (the radio connection failure cell and the time stamp) in step 115. If UE check list 15 is not full, then RNC 1 registers data for the UE (the radio connection failure cell and the time stamp) in step 116.

According to the present exemplary embodiment, there are thus realized a method of managing a list in the case where a UE has a plurality of radio connection failure cells, and a method of holding the effective times of radio connection failure cells of each UE, and effective data in the case where a great many UEs have failed to make a radio connection.

Since details of the internal variable "Number of RRC Connection Setup", the RRC Connection Setup Complete waiting timer, and the system data "Maximum Number of RRC Connection Setup" are known to those skilled in the art and have no direct bearing on the present invention, their description will be omitted.

Figure 8:
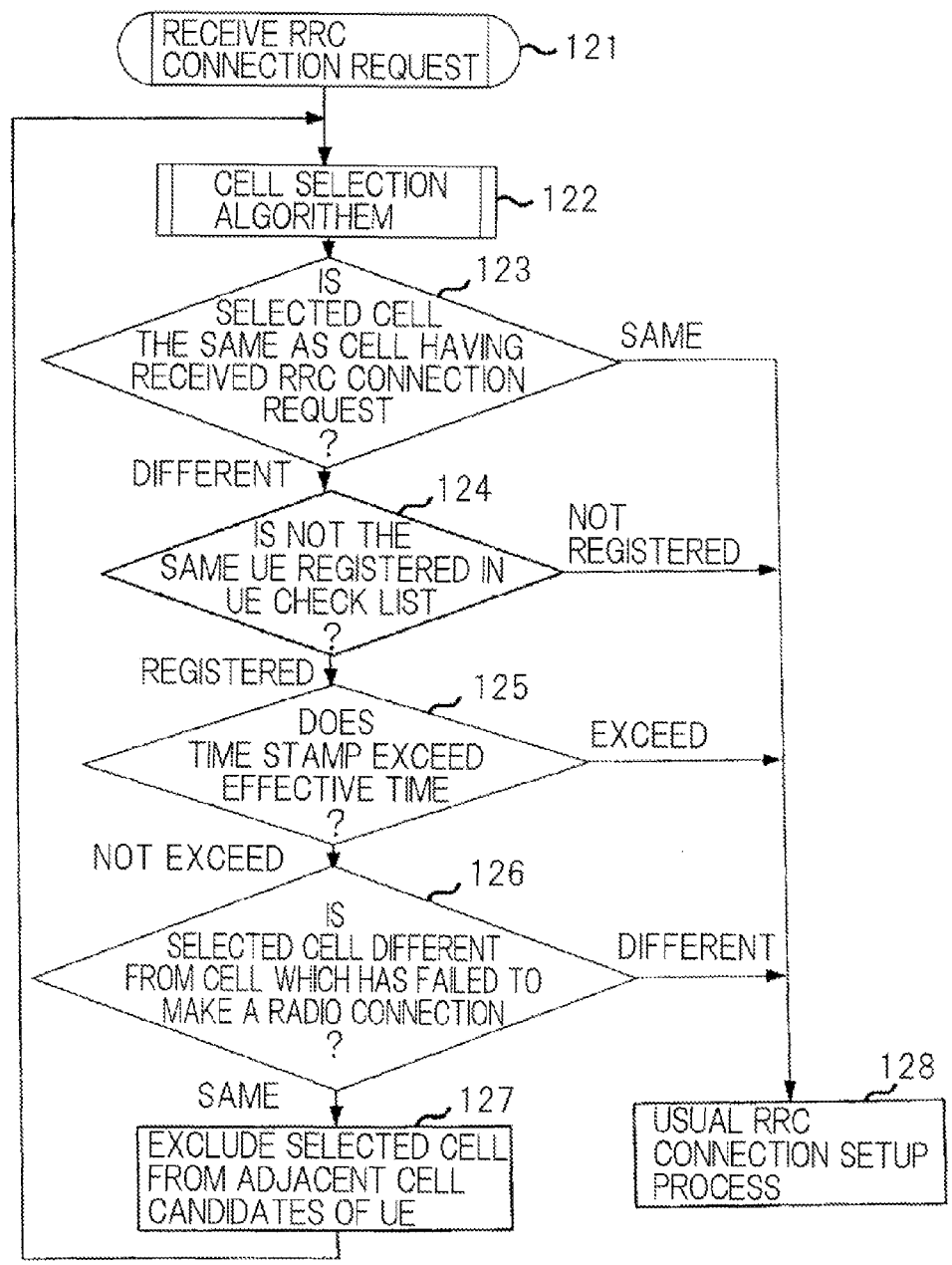
FIG. 8 is a flowchart of a cell selection algorithm using the UE check list upon receipt of the RRC Connection Request message according to Exemplary embodiment 1 of the present invention.

FIG. 8 is a flowchart of a cell selection algorithm using the UE check list upon the RRC Connection Request according to Exemplary embodiment 1 of the present invention. The cell selection algorithm using the UE check list upon receipt of the RRC Connection Request message according to Exemplary embodiment 1 of the present invention will be described below with reference to FIGS. 1, 3 to 6, and 8.

FIG. 8 shows, as a mechanism of using UE check list 15, a mode of operation in which the cell selection algorithm upon receipt of the RRC Connection Request message is executed while RNC 1 excludes a cell which the UE has failed to make a radio connection to once in the past, from adjacent cell candidates of the UE for a certain period from the time stamp.

When RNC 1 receives an RRC Connection Request message from a UE in step 121 shown in FIG. 8, cell selection processor 11 of RNC 1 executes in step 122 a cell selection algorithm using information obtained from cell information 13, UE information 14, and UE information processor 12.

First, in step 123, RNC 1 determines whether or not the cell selected according to the cell selection algorithm is the same as the cell to which the UE has initially sent the RRC Connection Request message. If the cell selected according to the cell selection algorithm is the same as the cell to which the UE has initially sent the RRC Connection Request message, then control goes to the usual RRC Connection Setup Process in step 128.

If the cell selected according to the cell selection algorithm is different from the cell to which the UE has initially sent the RRC Connection Request message, then RNC 1 determines in step 124 whether or not the same UE has been registered in UE check list 15. If the same UE has not been registered, then control goes to the usual RRC Connection Setup Process in step 128.

If the same UE has been registered, then RNC 1 determines in step 125 whether or not the time stamp for the UE in UE check list 15 exceeds the effective time of the information held by UE check list 15. If the time stamp exceeds the effective time, then control goes to the usual RRC Connection Setup Process in step 128.

If the time stamp does not exceed the effective time, then RNC 1 determines in step 126 whether or not the cell selected according to the cell selection algorithm is different from the cells which have failed to make a radio connection in UE check list 15. If the cell selected according to the cell selection algorithm is different from cell(s) in UE check list 15 to which the UE has failed to make a radio connection, then control goes to the usual RRC Connection Setup Process in step 128.

If the cell selected according to the cell selection algorithm is the same as a cell(s) in UE check list 15 to which the UE has failed to make a radio connection, then RNC 1 judges that the cell is not suitable as the result of the cell selection algorithm, and excludes the cell from the adjacent cell candidates of the UE in step 127. Control then goes to step 122.

According to the present exemplary embodiment, as a cell selection algorithm of RNC 1, a cell selection algorithm is executed wherein RNC 1 excludes a cell(s) to which the UE has failed to make a radio connection once in the past, from adjacent cell candidates of the UE for a certain period from the time stamp thereof.

According to the present exemplary embodiment, as the cell selection algorithm upon receipt of the RRC Connection Request, since RNC 1 selects a cell by excluding a cell(s) which the UE has failed to make a radio connection to once in the past, from adjacent cell candidates of the UE, a cell to which the UE is able to make a radio connection can be selected when the UE is to resend the RRC Connection Request. It is thus possible to avoid a large reduction in a call connection completion ratio while making the best use of the advantages of the existing cell selection algorithm.

Furthermore, according to the present exemplary embodiment, since the time stamp(s) of a cell(s) to which the UE has failed to make a radio connection once in the past are held for each UE, the cell(s) to which the UE has failed to make a radio connection based on the old information in the past are not excluded. Therefore, it is possible to make the best use of the advantages of the existing cell selection algorithm.

Still furthermore, according to the present exemplary embodiment, only when the UE fails to make a radio connection to a cell, the cell is registered in UE check list 15, so that the number of times that cells are registered in UE check list 15 is limited to the restricted case. Consequently, any effect that the registration has on the system is minimized as compared with the process which confirms at all times whether or not cells have been registered in the UE check list.

Yet still furthermore, according to the present exemplary embodiment, the cell selected according to the cell selection algorithm is compared with cells in UE check list 15, only when it is different from the cell to which the UE has sent the RRC Connection Request. Thus, the number of times that UE check list 15 is searched is limited to the restricted case. Consequently, any effect that the registration has on the system is minimized as compared with the process which confirms at all times whether or not cells have been registered in the UE check list.

In addition, according to the present exemplary embodiment, since the time stamps for the cell(s) to which the UE has failed to make a radio connection once in the past are held, it is not necessary to take the trouble to delete the UE from UE check list 15, even when the RRC Connection Setup Complete is received and a call connection is completed without any problems. Therefore, any effect that the registration has on the system is minimized.

FIG. 9 is a diagram showing details of UE check list #2 according to Exemplary embodiment 2 of the present invention. The configurations of the RNC and the mobile communication system according to Exemplary embodiment 2 of the present invention are identical to those according to Exemplary embodiment 1 of the present invention described above. However, details of the UE check list #2 are modified.

As shown in FIG. 9, UE check list #2 holds a list of cell(s) to which each UE has failed to make a radio connection once in the past and time stamp(s) at which the UE made a connection request to the respective cells.

In the example shown in FIG. 9, cell ID #8 is registered for UE #1 as a cell to which the UE has failed to make a radio connection once at Time: 00130, and cell ID #10 and cell ID #11 are registered for UE #2 as cells to which the UE has failed to make a radio connection once at Time: 00145 and Time: 00150, respectively.

Figure 10:
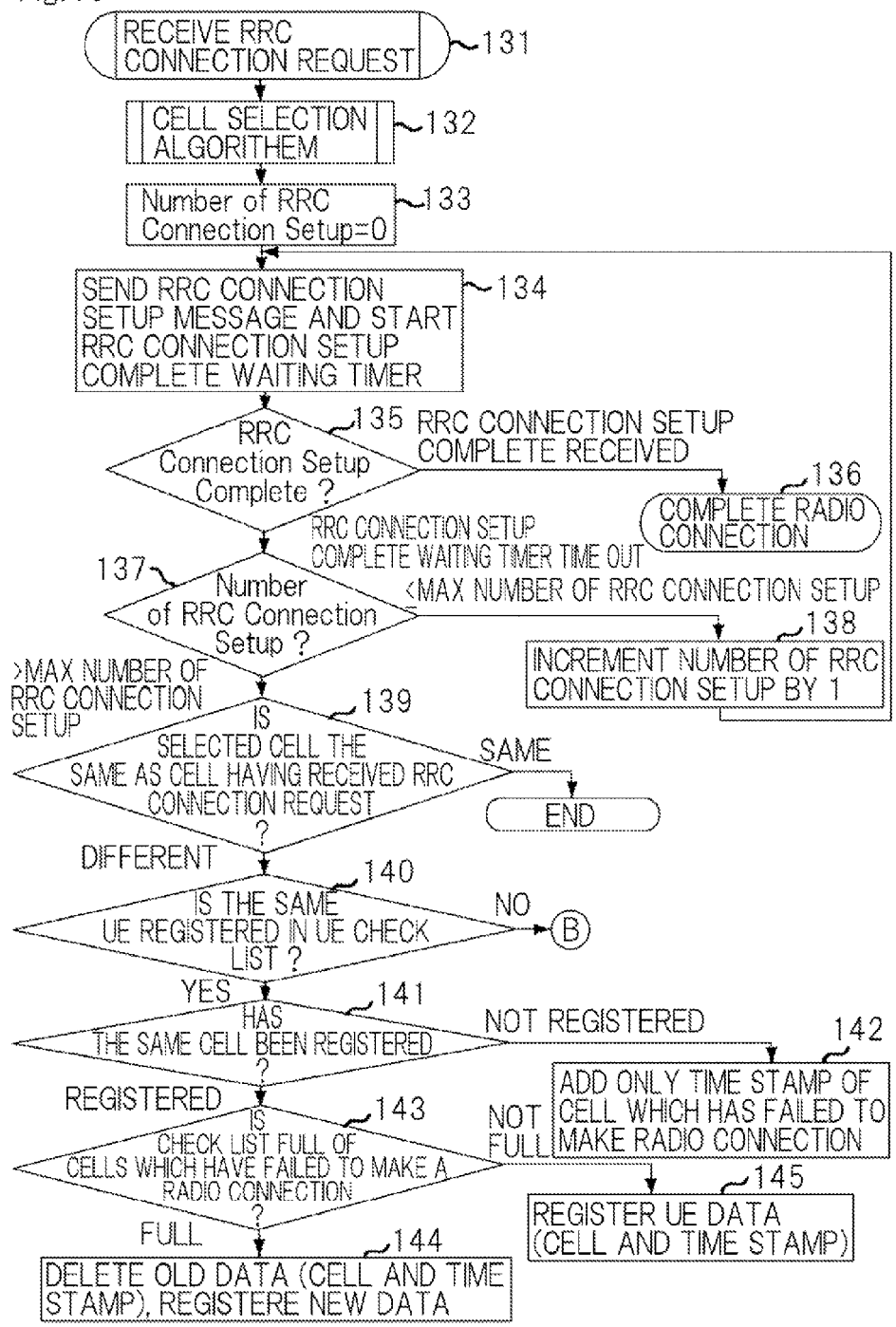
FIG. 10 is a flowchart of a process of registering the UE check list upon receipt of an RRC Connection Request message according to Exemplary embodiment 2 of the present invention.
Figure 11:
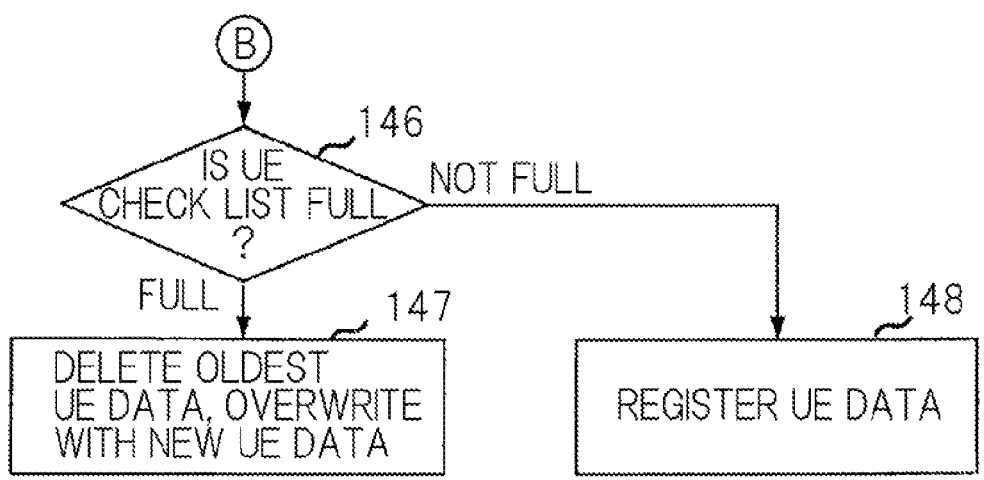
FIG. 11 is a flowchart of the process of registering the UE check list upon receipt of the RRC Connection Request message according to Exemplary embodiment 2 of the present invention.

FIGS. 10 and 11 are flowcharts of a process of registering the UE check list upon receipt of an RRC Connection Request message according to Exemplary embodiment 2 of the present invention. The process of registering the UE check list upon receipt of an RRC Connection Request message according to Exemplary embodiment 2 of the present invention will be described below with reference to FIGS. 1, 3, 5, and 9 to 11.

FIGS. 10 and 11 show a mode of operation in which after the cell selection algorithm has been executed upon receipt of an RRC Connection Request message, the UE fails to make a radio connection and is registered in the UE check list #2 shown in FIG. 9.

When RNC 1 receives an RRC Connection Request message from an UE in step 131 shown in FIG. 10, cell selection processor 11 of RNC 1 executes in step 132 a cell selection algorithm using information obtained from cell information 13, the management of the UE information, and UE information processor 12.

RNC 1 initializes in step 133 an internal variable "Number of RRC Connection Setup" to 0. Then, in step 134, RNC 1 sends an RRC Connection Setup message to the selected cell, and starts an RRC Connection Setup Complete waiting timer.

RNC 1 determines in step 135 whether or not it has received an RRC Connection Setup Complete. If it has received the RRC Connection Setup Complete, a radio connection is completed in step 136 as in the existing process.

If RNC 1 has not received the RRC Connection Setup Complete and the RRC Connection Setup Complete waiting timer times out, then RNC 1 determines in step 137 whether or not the internal variable "Number of RRC Connection Setup" exceeds system data "Maximum Number of RRC Connection Setup".

If the internal variable "Number of RRC Connection Setup" does not exceed the system data "Maximum Number of RRC Connection Setup", RNC 1 increments the internal variable "Number of RRC Connection Setup" by 1 in step 138. Then, control returns to step 134.

If the internal variable "Number of RRC Connection Setup" exceeds the system data "Maximum Number of RRC Connection Setup", then RNC 1 judges that a radio connection has failed, and determines in step 139 whether or not the cell selected according to the cell selection algorithm is the same as the cell to which the UE has initially sent the RRC Convection Request message.

If the cell selected according to the cell selection algorithm is the same as the cell to which the UE has initially sent the RRC Connection Request message, then RNC 1 puts an end to the process without registering the cell in the UE check list #2.

If the cell selected according to the cell selection algorithm is different from the cell to which the UE has initially sent the RRC Connection Request message, then RNC 1 determines in step 140 whether or not the same UE has been registered in the UE check list #2.

If the same UE has been registered in the UE check list #2, then RNC 1 determines in step 141 whether or not a cell which has already failed to make a radio connection has been registered in UE check list #2.

If a cell to which the UE has already failed to make a radio connection has not been registered in the UE check list #2, then RNC 1 adds in step 142 only the time stamp for a cell(s) to which the UE has failed to make a radio connection in UE check list #2.

If a cell to which the UE has already failed to make a radio connection has been registered in UE check list #2, then RNC 1 determines in step 143 whether or not the UE check list has been full of cells to which the UE has failed to make a radio connection.

If the UE check list has been full of cells to which the UE has failed to make a radio connection, then RNC 1 deletes in step 144 the oldest data for the UE (the radio connection failure cell and the time stamp) and registers the new data for the UE (the radio connection failure cell and the time stamp).

If the UE check list has not been full of cells to which the UE has failed to make a radio connection, then RNC 1 registers data for the UE (the radio connection failure cell and the time stamp) in step 145.

If the same UE has not been registered in UE check list #2, then RNC 1 determines in step 146 shown in FIG. 11 whether or not the UE check list #2 is full.

If the UE check list #2 is full, then RNC 1 deletes the oldest data (the radio connection failure cell and the time stamp) for the UE and registers new data for the UE (the radio connection failure cell and the time stamp) in step 147. If UE check list #2 is not full, then RNC 1 registers data for the UE (the radio connection failure cell and the time stamp) in step 148.

According to the present exemplary embodiment, there are thus realized a method of managing a list in the case where a UE has a plurality of radio connection failure cells, a method of updating the effective times of radio connection failure cells for ach UE, a method of holding effective data in the case where radio connections to a great many cells have failed, and a method of holding effective data in the case where a great many UEs have failed to make a radio connection to cells.

Since details of the internal variable "Number of RRC Connection Setup", the RRC Connection Setup Complete waiting timer, and the system data "Maximum Number of RRC Connection Setup" are known to those skilled in the art and have no direct bearing on the present invention, their description will be omitted.

Figure 12:
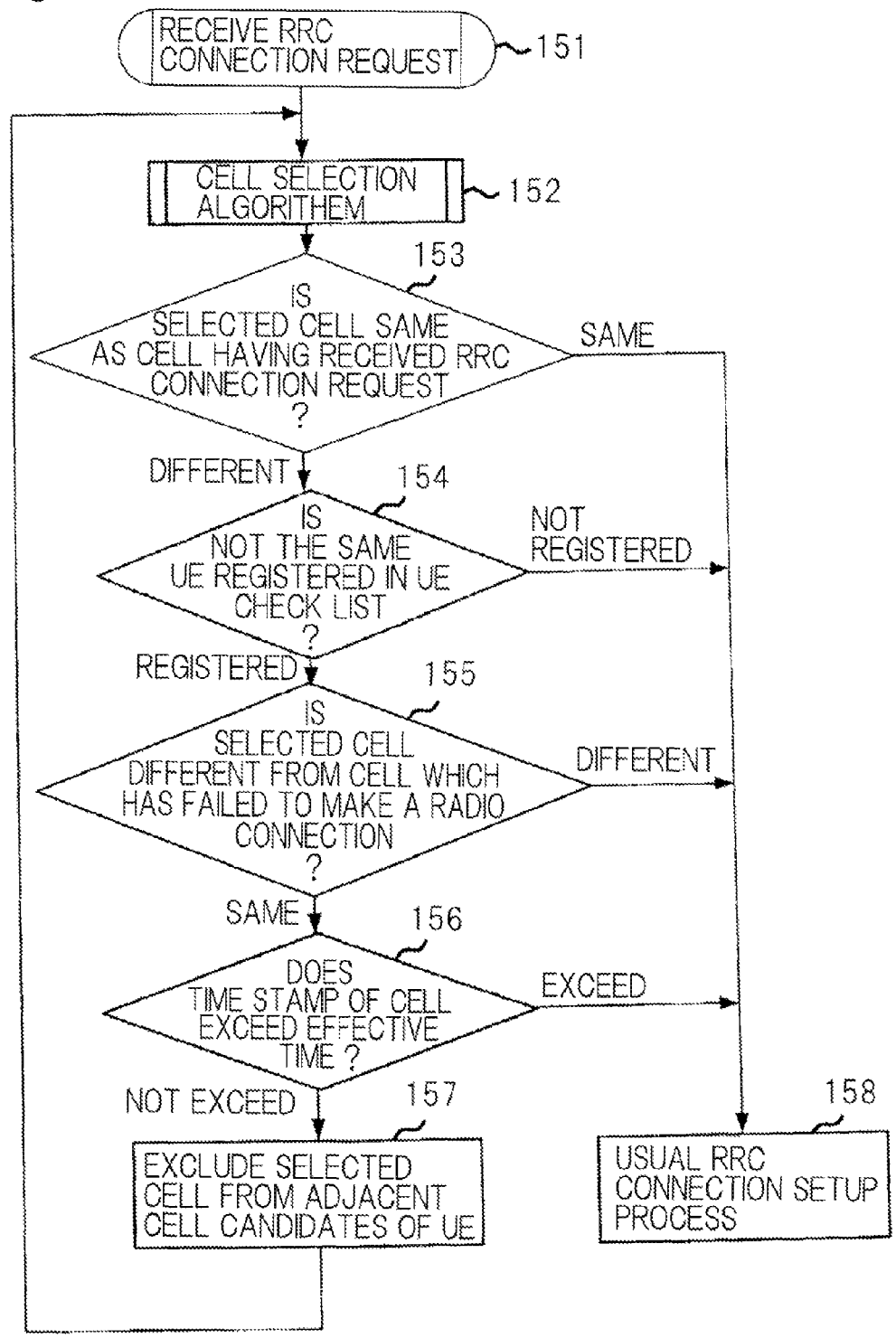
FIG. 12 is a flowchart of a cell selection algorithm which utilizes the UE check list upon receipt of the RRC Connection Request message according to Exemplary embodiment 2 of the present invention.

FIG. 12 is a flowchart of a cell selection algorithm using the UE check list upon the RRC Connection Request according to Exemplary embodiment 2 of the present invention. The cell selection algorithm using the UE check list upon receipt of the RRC Connection Request message according to Exemplary embodiment 2 of the present invention will be described below with reference to FIGS. 1, 3, 5, 9, and 12.

FIG. 12 shows, as a mechanism of using the UE check list #2, a mode of operation in which the cell selection algorithm upon receipt of the RRC Connection Request message is executed while RNC 1 excludes a cell(s) to which the UE has failed to make a radio connection once in the past, from adjacent cell candidates of the UE for a certain period from the time stamp.

When RNC 1 receives an RRC Connection Request message from a UE in step 151 shown in FIG. 12, cell selection processor 11 of RNC 1 executes in step 152 a cell selection algorithm using information obtained from cell information 13, UE information 14, and UE information processor 12.

In step 153, RNC 1 determines whether or not the cell selected according to the cell selection algorithm is the same as the cell to which the UE has initially sent the RRC Connection Request message. If the cell selected according to the cell selection algorithm is the same as the cell to which the UE has initially sent the RRC Connection Request message, then control goes to a usual RRC Connection Setup Process in step 158.

If the cell selected according to the cell selection algorithm is different from the cell to which the UE has initially sent the RRC Connection Request message, then RNC 1 determines in step 154 whether or not the same UE has not been registered in the UE check list #2. If the same UE has not been registered, then control goes to the usual RRC Connection Setup Process in step 158.

If the same UE has been registered, then RNC 1 determines in step 155 whether or, not the cell selected according to the cell selection algorithm is different from the cells which have failed to make a radio connection in the UE check list. If the cell selected according to the cell selection algorithm is different from the cells in the UE check list to which the UE has failed to make a radio connection, then control goes to the usual RRC Connection Setup Process in step 158.

If the cell selected according to the cell selection algorithm is the same as the cells in the UE check list to which the UE has failed to make a radio connection, then RNC 1 determines in step 156 whether or not the time stamp of the cell exceeds the effective time of the information held by the UE check list. If the time stamp exceeds the effective time, then control goes to the usual RRC Connection Setup Process in step 158.

If the time stamp does not exceed the effective time, then RNC 1 judges that the cell is not suitable for the result of the cell selection algorithm, and excludes the cell from the adjacent cell candidates of the UE in step 157. Control then goes to step 152.

According to the present exemplary embodiment, the cell selection algorithm is executed wherein RNC 1 excludes a cell(s) which the UE has failed to make a radio connection once in the past, from adjacent cell candidates of the UE for a certain period from the time stamp thereof.

According to the present exemplary embodiment, since the time stamps of the cells which the UE has failed to make a radio connection to once in the past are held for each UE and for each cell, the cells can be excluded by determining whether each cell is a cell to which the UE has failed to make a radio connection based on old information or each cell is a cell to which the UE has failed to make a radio connection based on new information, and cells are excluded. Therefore, it is possible to make the best use of the advantages of the existing cell selection algorithm.

Figures 13, 14:
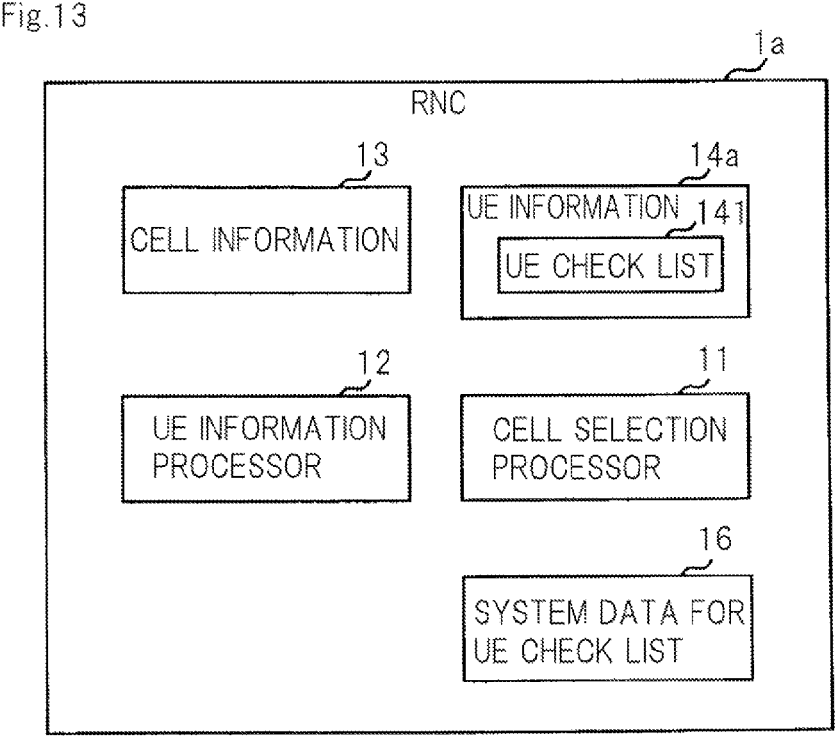
FIG. 13 is a block diagram showing a configurational example of an RNC according to Exemplary embodiment 3 of the present invention.
FIG. 14 is a diagram showing details of a UE check list for each UE shown in FIG. 13.

FIG. 13 is a block diagram showing a configurational example of an RNC according to Exemplary embodiment 3 of the present invention. RNC 1a according to Exemplary embodiment 3 of the present invention shown in FIG. 13 has the same configuration as in Exemplary embodiment 1 of the present invention except that UE information 14a includes UE check list 141 for each UE, rather than UE check list 15 for each system. Those components of RNC 1a which are identical to those of RNC 1 are denoted by identical reference characters. A mobile communication system according to Exemplary embodiment 3 of the present invention has the same configuration as the mobile communication system according to Exemplary embodiment 3 of the present invention shown in FIG. 1.

According to Exemplary embodiment 3 of the present invention, a further modified method of excluding the cells which the UE has failed to make a radio connection once in the past is employed in a cell selection algorithm when UE changes channel types from a shared channel to a dedicated channel [a CTS FACH (Forward Access Channel) to a DCH (Dedicated Channel)] due to the reception of a traffic increase report from the UE or the detection of a transfer buffer increase in RNC 1a while connecting a packet service via a shared channel.

In order to hold the information of an UE which is present in a shared channel, RNC 1a holds, as part of UE information 14a, a list of cells to which the UE has failed to make a radio connection once and time stamps of the radio connection failures.

FIG. 14 is a diagram showing details of UE check list 141 for each UE shown in FIG. 13. As shown in FIG. 14, UE check list 141 for each UE holds a list of cells to which the UE has failed to make a radio connection once and time stamps when a connection request is made by the UE.

In the example shown in FIG. 14, cell ID #10 is registered as a cell to which the UE has failed to make a radio connection once at Time: 00145, and cell ID #11 is registered as a cell to which the UE has failed to make a radio connection once at Time: 00150.

Figure 15:
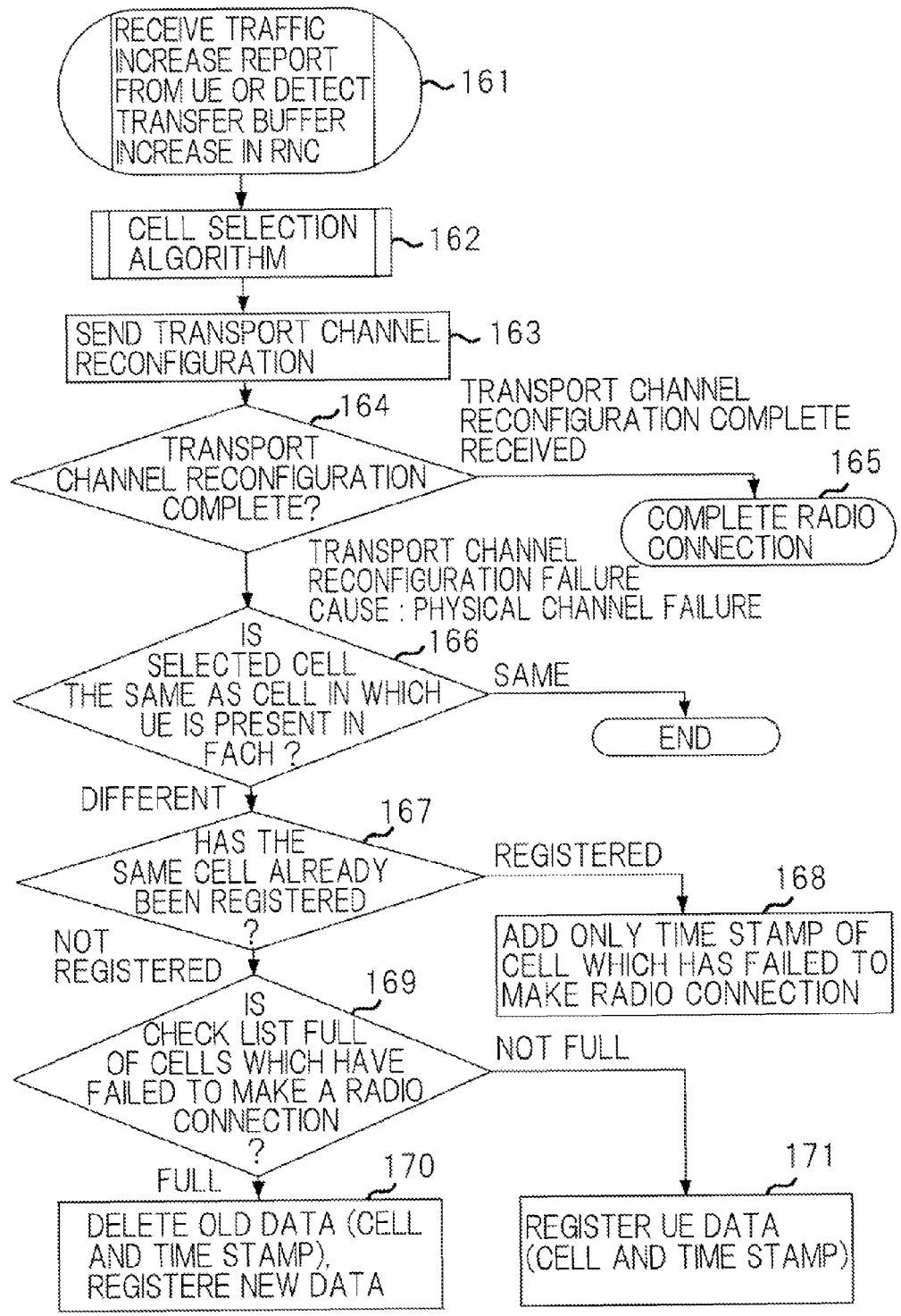
FIG. 15 is a flowchart of a process of registering a UE check list when a CTS is performed, according to Exemplary embodiment 3 of the present invention.

FIG. 15 is a flowchart of a process of registering a UE check list upon the CTS according to Exemplary embodiment 3 of the present invention. The process of registering a UE check list when CTS is performed, according to Exemplary embodiment 3 of the present invention will be described below with reference to FIGS. 1, 5, and 13 to 15.

FIG. 15 shows a mode of operation in which after a cell selection algorithm is executed when a UE changes channel types from a shared channel to a dedicated channel (a CTS FACH to a DCH) due to receipt of a traffic increase report from the UE or the detection of a transfer buffer increase in RNC 1a while connecting a packet service via a shared channel, the UE has failed to make a radio connection to a cell and the cell to which the UE has failed to make a radio connection is registered in UE check list 141 for each UE.

When RNC 1a receives a traffic increase report from the UE or detects a transfer buffer increase in RNC 1a in step 161 shown in FIG. 15, cell selection processor 11 of RNC 1a executes in step 162 a cell selection algorithm using information obtained from cell information 13, UE information 14 and UE information processor 12.

RNC 1a sends in step 163 an RRC (Transport Channel Reconfiguration) to the selected cell. Thereafter, RNC 1a determines in step 164 whether or not it has received an RRC (Transport Channel Reconfiguration) Complete.

If RNC 1a has received an RRC: (Transport Channel Reconfiguration) Complete, then a radio connection is completed as in the existing process in step 165.

If RNC 1a has received an RRC: (Transport Channel Reconfiguration) Failure for the reason of the physical channel failure, then RNC 1a judges that a radio connection has failed, and determines in step 166 whether or not the cell selected according to the cell selection algorithm is the same as the cell in which the UE is present in a FACH.

If the cell selected according to the cell selection algorithm is the same as the cell in which the UE is present in the FACH, then RNC 1a puts an end to the process without registering the UE in UE check list 141.

If the cell selected according to the cell selection algorithm is different from the cell in which the UE is present in the FACH, then RNC 1a determines in step 167 whether or not cells which have failed to make a radio connection have already been registered in UE check list 141.

If cells to which the UE has failed to make a radio connection have already been registered in UE check list 141, then RNC 1a updates only the time stamps of the cells to which the UE has failed to make a radio connection in step 168.

If cells to which the UE has failed to make a radio connection have not been registered in UE check list 141, then RNC 1a determines in step 109 whether or not UE check list 141 is full of cells to which the UE has failed to make a radio connection.

If UE check list 141 is full of cells which the UE has failed to make a radio connection, then RNC 1a overwrites the oldest data for the UE (the radio connection failure cell and the time stamp) with new data for the UE (the radio connection failure cell and the time stamp of the cell).

If UE check list 141 is not full of cells to which the UE has failed to make a radio connection, then RNC 1a registers data for the UE (the radio connection failure cell and the time stamp) in step 171.

Figure 16:
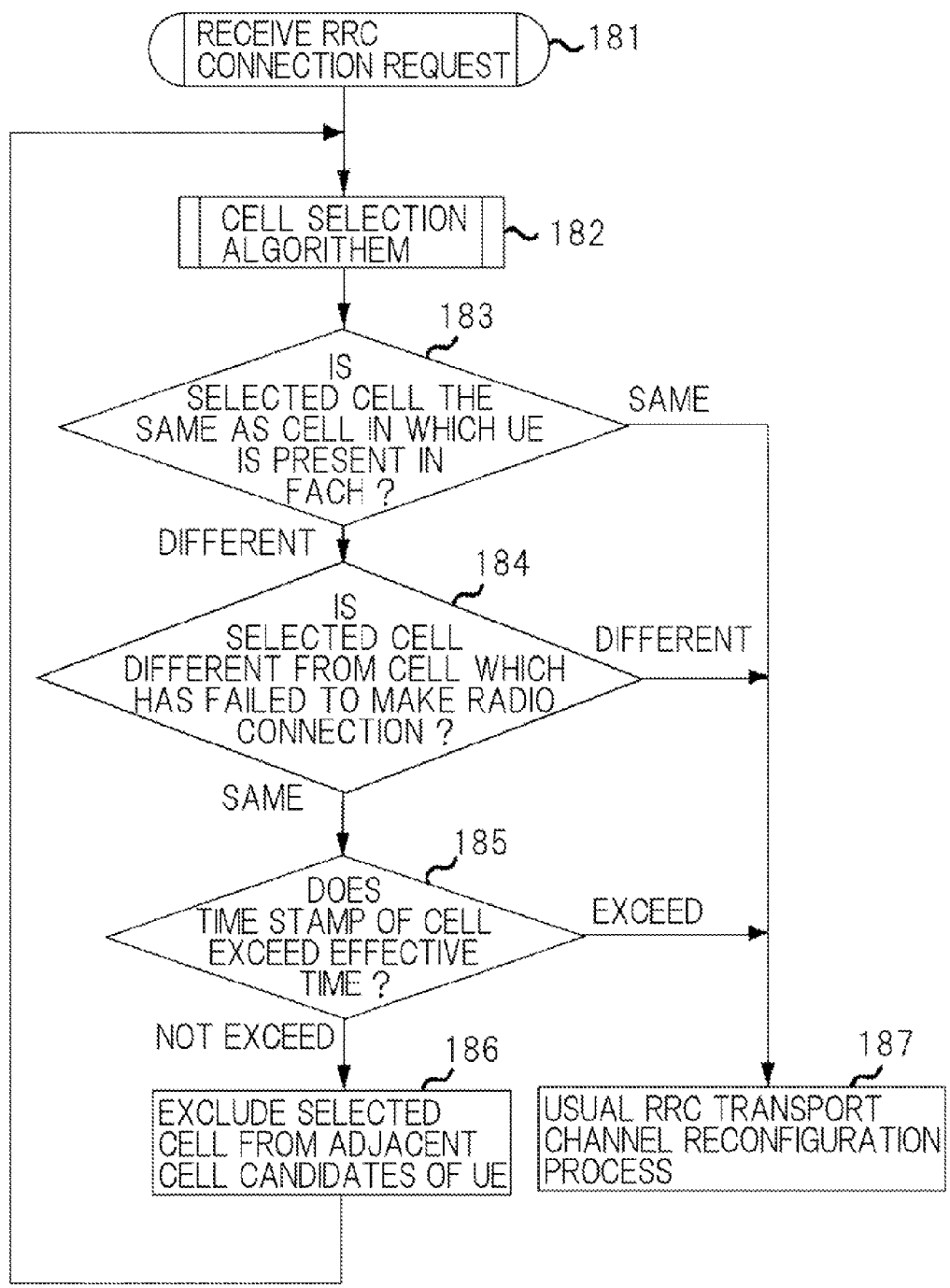
FIG. 16 is a flowchart of a cell selection algorithm which utilizes the UE check list when the CTS is performed, according to Exemplary embodiment 3 of the present invention.

FIG. 16 is a flowchart of a cell selection algorithm which utilizes the UE check list when the CTS is performed, according to Exemplary embodiment 3 of the present invention. The cell selection algorithm which utilizes the UE check list when the CTS is performed according to Exemplary embodiment 3 of the present invention will be described below with reference to FIGS. 1, 5, 13, 14, and 16.

FIG. 16 shows, as a mechanism of using UE check list 14, a mode of operation in which the cell selection algorithm upon receipt of a traffic increase report from the UE or the detection of a transfer buffer increase in RNC 1a is executed while RNC 1a excludes a cell(s) to which the UE has failed to make a radio connection once in the past, from adjacent cell candidates of the UE for a certain period from the time stamp.

When RNC 1a receives a traffic increase report from the UE or detects a transfer buffer increase in RNC 1a in step 181 shown in FIG. 16, cell selection processor 11 of RNC 1a executes in step 182 a cell selection algorithm using information obtained from cell information 13, UE information 14a, and UE information processor 122.

RNC 1a determines in step 183 whether or not the cell selected according to the cell selection algorithm is the same as the cell in which the UE is present in a FACH.

If the cell selected according to the cell selection algorithm is the same as the cell in which the UE is present in the FACH, then control goes to the usual RRC (Transport Channel Reconfiguration) Process in step 187.

If the cell selected according to the cell selection algorithm is different from the cell in which the UE is present in the FACH, then RNC 1a determines in step 184 whether or not the cell selected according to the cell selection algorithm is different from the cell(s) to which the UE has failed to make a radio connection in UE check list 141.

If the cell selected according to the cell selection algorithm is different from the cells in UE check list 141 which the UE has failed to make a radio connection, then control goes to the usual RRC: Transport Channel Reconfiguration Process in step 187.

If the cell selected according to the cell selection algorithm is the same as a cell (s) in UE check list 141 to which the UE has failed to make a radio connection, then RNC 1a determines in step 185 whether or not the time stamp(s) of the cell(s) exceed(s) the effective time of the information held by UE check list 141.

If the time stamp of the cell exceeds the effective time of the information held by UE check list 141, then control goes to the usual RRC (Transport Channel Reconfiguration) Process in step 187.

If the time stamp of the cell does not exceed the effective time of the information held by UE check list 141, then RNC 1a judges that the cell is not suitable for the result of the cell selection algorithm, and excludes the cell from the adjacent cell candidates of the UE in step 186. Control then goes to step 182.

According to the present exemplary embodiment, the cell selection algorithm in RNC 1a is executed wherein RNC 1a excludes a cell(s) to which the UE has failed to make a radio connection once in the past, from adjacent cell candidates of the UE for a certain period from the time stamp thereof.

According to the present exemplary embodiment, since a cell(s) to which the UE has failed to make a radio connection once in the past is (are) excluded from adjacent cell candidates upon receipt of a traffic increase report from the UE or the detection of a transfer buffer increase in RNC 1a, a cell(s) to which a radio connection can be made can be selected upon periodic reception of a traffic increase report from the UE, or upon periodic detection of a transfer buffer increase in RNC 1a. It is thus possible to avoid a large reduction in a call connection completion ratio while making the best use of the advantages of the existing cell selection algorithm.

According to the present exemplary embodiment, since the time stamps of a cell(s) to which the UE has failed to make a radio connection once in the past is (are) held for each cell, the cell(s) can be excluded by determining whether or not each cell is a cell that the UE has failed to make a radio connection to based on old information or each cell is a cell to which the UE has failed to make a radio connection based on new information. Therefore, it is possible to make the best use of the advantages of the existing cell selection algorithm.

According to the present invention, as described above, the cell selected according to the cell selection algorithm is held for a certain period of time in the event a radiation connection to the cell fails; RNC 1, 1a determine whether or not the cell is the same as a cell to which the UE has failed to make a radio connection once in the past in the cell selection algorithm upon the resending of an RRC Connection Request from the UE, the periodic reception of a traffic increase report from the UE, or the periodic detection of a transfer buffer increase in RNC 1, 1a, and if the cell is a cell to which the UE has failed to make a radio connection in the past, then the cell selection algorithm is executed. Therefore, it possible to avoid a large reduction in a call connection completion ratio while making the best use of the advantages of the cell selection algorithm relevant to the present invention.

Specifically, according to the present invention, when RNC 1, 1a execute the cell selection algorithm and assign a cell which is different from the cell that the UE has camped on, RNC 1, 1a hold the cell to which the UE has not responded once for a certain period, and excludes the cell from adjacent cell candidates of the UE in the next cell selection algorithm.

According to the present invention, therefore, when the UE resends the RRC Connection Request, another cell is selected, thus avoiding a reduction in a call connection completion ratio.

According to the present invention, in the IMT 2000 system architecture, RNC 1, 1a controls a plurality of cells having different frequencies with the same antenna, and executes a cell selection algorithm on an UE which has a radio connection request. According to the present invention, furthermore, RNC 1, 1a hold for each UE a cell(s) to which the UE has failed to make a radio connection and time stamps of connection requests from each UE in the UE check list.

Specifically, according to the present invention, when RNC 1, 1a select a cell that is different from a cell to which a UE has sent an RRC Connection Request message according to the cell selection algorithm of RNC 1, 1a, and sends an RRC Connection Setup message, if RNC 1, 1a do not receive an RRC Connection Setup Complete message from the UE, then RNC 1, 1a hold in the UE check list in an internal memory of RNC 1, 1a a cell(s) to which the UE has failed to make a radio connection and the time stamp(s) of the connection request from the UE.

Furthermore, according to the present invention, when a UE sends an RRC Connection Request message and RNC 1, 1a select a cell which is different from the presently selected cell according to the cell selection algorithm, RNC 1, 1a confirm whether or not the UE is present in the UE check list, and exclude a cell(s) to which the UE has failed to make a radio connection once in the past, from adjacent cell candidates of the UE for a certain period from the time stamp, for the cell selection algorithm.

According to the present invention, when RNC 1, 1a make a radio connection to a UE at the moments to be described below, a cell(s) to which the UE has failed to make a radio connection is(are) held in the UE check list for a certain period, and if the UE is present in the UE check list, then the cell(s) to which the UE has failed to make a radio connection once in the past are excluded from adjacent cell candidates of the UE for a certain period from the time stamp to execute the cell selection algorithm. According to the present invention, therefore, it is possible to avoid a large reduction in a call connection completion ratio while making the best use of the advantages of the existing cell selection algorithm.

The moments at which RNC 1, 1a make a radio connection to the UE are:

1. when RNC 1, 1a receives a first RRC Connection Request message; and
2. when RNC 1, 1a changes channel types from a shared channel to a dedicated channel (a CTS FACH to a DCH) upon the receipt of a traffic increase report from the UE or upon detection of a transfer buffer increase in RNC 1, 1a while connecting a packet service via a shared channel.

The present invention is applied to the IMT 2000 system architecture wherein a plurality of various types of cells having different frequencies are present with the same antenna, in order to avoid a large reduction in a call connection completion ratio if the traffic balance between cells is poor and if cell breathing is occurring when an RNC executes a cell selection algorithm 1) upon receipt of an initial RRC Connection Request message, or 2) changing of channel types from a shared channel to a dedicated channel (a CTS FACH to a DCH) due to the reception of a traffic increase report from the UE, or 3) detection of a transfer buffer increase in the RNC while connecting a packet service via a shared channel.

While the present invention has been described above with reference to Exemplary embodiments 1 to 3, the present invention is not limited to above Exemplary embodiments 1 to 3, and it is to be understood that changes and variations may be made without departing from the spirit or scope of the following claims.

The invention claimed is:

1. A radio network controller to be connected to a mobile terminal via a radio base station, comprising:
   holding means for holding information of one or more cells selected according to a cell selection algorithm for assigning one or more cells under said radio base station to said mobile terminal, for a predetermined period if a radio connection to the one or more cells fails; and
   executing means for excluding, based on the held information of cells, one or more cells to which a radio connection has failed once in the past, and for executing said cell selection algorithm, wherein
   said holding means holds for a predetermined period information of one or more cells to which no response is received from said mobile terminal when said cell selection algorithm assigns to said mobile terminal a cell which is different from one or more cells which said mobile terminal has camped on; and
   said executing means excludes said cell from adjacent cell candidates of said mobile terminal in the cell selection algorithm and executes the cell selection algorithm.

2. A radio network controller to be connected to a mobile terminal via a radio base station, comprising:
   holding means for holding information of one or more cells selected according to a cell selection algorithm for assigning one or more cells under said radio base station to said mobile terminal, for a predetermined period if a radio connection to the one or more cells fails; and
   executing means for excluding, based on the held information of cells, one or more cells to which a radio connection has failed once in the past, and for executing said cell selection algorithm,
   wherein said holding means holds one or more cells to which a radio connection has failed and the time stamp of a connection request from said mobile terminal for each system,
   wherein said executing means excludes one or more cells to which a radio connection has failed once in the past from adjacent cell candidates of said mobile terminal for a predetermined period from the time stamp of the cell, and executes said cell selection algorithm.

3. A method of avoiding a reduction in a call connection completion ratio in a radio network controller to be connected to a mobile terminal via a radio base station, the method comprising:
   holding information of one or more cells selected according to a cell selection algorithm for assigning one or more cells under said radio base station to said mobile terminal, for a predetermined period if a radio connection to the one or more cells fails; and
   excluding, based on the held information of cells, one or more cells to which a radio connection has failed once in the past, and of executing said cell selection algorithm with executing means, wherein
   said holding includes holding for a predetermined period information of one or more cells to which no response is received from said mobile terminal when said cell selection algorithm assigns to said mobile terminal a cell which is different from one or more cells which said mobile terminal has camped on; and
   said executing includes excluding said cell from adjacent cell candidates of said mobile terminal in the cell selection algorithm, and executing said cell selection algorithm.

4. A method of avoiding a reduction in a call connection completion ratio in a radio network controller to be connected to a mobile terminal via a radio base station, the method comprising:
   holding information of one or more cells selected according to a cell selection algorithm for assigning one or more cells under said radio base station to said mobile terminal, for a predetermined period if a radio connection to the one or more cells fails; and
   excluding, based on the held information of cells, one or more cells to which a radio connection has failed once in the past, and of executing said cell selection algorithm with executing means,
   wherein said holding holds one or more cells to which a radio connection has failed and the time stamp of a connection request from said mobile terminal for each system,
   wherein said executing includes excluding one or more cells to which a radio connection has failed once in the past, from adjacent cell candidates of said mobile terminal for a predetermined period from the time stamp or time stamps of the one or more cells, and executing said cell selection algorithm.

5. A radio network controller to be connected to a mobile terminal via a radio base station, comprising:
   holding means for holding information of one or more cells selected according to a cell selection algorithm for assigning one or more cells under said radio base station to said mobile terminal, for a predetermined period if a radio connection to the one or more cells fails; and
   executing means for excluding, based on the held information of cells, one or more cells to which a radio connection has failed once in the past, and for executing said cell selection algorithm,
   wherein said holding means holds one or more cells to which a radio connection has failed and the time stamp of a connection request from said mobile terminal for each mobile terminal,
   wherein said executing means excludes one or more cells to which a radio connection has failed once in the past from adjacent cell candidates of said mobile terminal for a predetermined period from the time stamp of the cell, and executes said cell selection algorithm.

6. A method of avoiding a reduction in a call connection completion ratio in a radio network controller to be connected to a mobile terminal via a radio base station, the method comprising:
   holding information of one or more cells selected according to a cell selection algorithm for assigning one or more cells under said radio base station to said mobile terminal, for a predetermined period if a radio connection to the one or more cells fails; and
   excluding, based on the held information of cells, one or more cells to which a radio connection has failed once in the past and of executing said cell selection algorithm with executing means,
   wherein said holding includes holding one or more cells to which a radio connection has failed and the time stamp of a connection request from said mobile terminal for each mobile terminal,
   wherein said executing includes excluding one or more cells to which a radio connection has failed once in the past, from adjacent cell candidates of said mobile terminal for a predetermined period from the time stamp or time stamps of the one or more cells, and executing said cell selection algorithm.

* * * * *